United States Patent
Chiang et al.

(10) Patent No.: US 8,369,420 B2
(45) Date of Patent: Feb. 5, 2013

(54) MULTIMODE FILTER FOR DE-BLOCKING AND DE-RINGING

(75) Inventors: Patricia Chiang, Singapore (SG); Ilija Materic, Grenoble (FR); Martin Bolton, Blagdon (GB); Nicolas Pellerin, Lans en Vercors (FR)

(73) Assignee: STMicroelectronics Asia Pacific Pte, Ltd., Singapore (SG)

( * ) Notice: Subject to any disclaimer, the term of this patent is extended or adjusted under 35 U.S.C. 154(b) by 1323 days.

(21) Appl. No.: 11/895,023

(22) Filed: Aug. 22, 2007

(65) Prior Publication Data

US 2008/0056389 A1    Mar. 6, 2008

(30) Foreign Application Priority Data

Aug. 31, 2006 (SG) .................. 200605978-6

(51) Int. Cl.
*H04N 7/12* (2006.01)

(52) U.S. Cl. ................. 375/240.29; 375/240.28

(58) Field of Classification Search ............ 375/240.29, 375/240.27, 240.28
See application file for complete search history.

(56) References Cited

U.S. PATENT DOCUMENTS

| | | | | |
|---|---|---|---|---|
| 5,227,863 A | * | 7/1993 | Bilbrey et al. ............ | 348/578 |
| 5,929,918 A | * | 7/1999 | Marques Pereira et al. .. | 348/448 |
| 6,229,923 B1 | * | 5/2001 | Williams et al. ............ | 382/224 |
| 6,891,892 B2 | * | 5/2005 | Yang ...................... | 375/240.25 |
| 6,927,775 B2 | * | 8/2005 | Schimpf et al. ............ | 345/503 |
| 7,508,448 B1 | * | 3/2009 | Lew et al. ................ | 348/448 |
| 2003/0184683 A1 | * | 10/2003 | Grigorian et al. .......... | 348/607 |
| 2003/0185305 A1 | * | 10/2003 | MacInnis et al. ......... | 375/240.25 |
| 2004/0085283 A1 | * | 5/2004 | Wang ..................... | 345/100 |
| 2004/0174350 A1 | * | 9/2004 | Wang ..................... | 345/204 |
| 2005/0163227 A1 | * | 7/2005 | Sullivan et al. ........... | 375/240.26 |
| 2005/0265460 A1 | * | 12/2005 | Jang ...................... | 375/240.29 |
| 2006/0132491 A1 | * | 6/2006 | Riach et al. .............. | 345/505 |
| 2006/0288065 A1 | * | 12/2006 | Lelescu ................... | 708/300 |
| 2007/0133688 A1 | * | 6/2007 | Tjandrasuwita et al. | 375/240.21 |
| 2007/0133692 A1 | * | 6/2007 | Reddy et al. ............. | 375/240.25 |
| 2007/0171988 A1 | * | 7/2007 | Panda et al. ............. | 375/240.29 |
| 2007/0172211 A1 | * | 7/2007 | Panda et al. ............. | 386/112 |

* cited by examiner

*Primary Examiner* — Eleni Shiferaw
*Assistant Examiner* — Abu Sholeman
(74) *Attorney, Agent, or Firm* — Munck Wilson Mandala, LLP

(57) ABSTRACT

A multimode filter that is versatile for digital signal processing including in-loop processing (de-blocking and de-ringing), post processing (de-blocking and de-ringing), and overlap smoothing. A flexi-standard filter includes the multimode filter. An electronic device includes the flexi-standard filter. A process for digital signal processing includes in-loop processing (de-blocking and de-ringing), post processing (de-blocking and de-ringing), and overlap smoothing.

39 Claims, 8 Drawing Sheets

MULTIMODE FILTER FOR DE-BLOCKING AND DE-RINGING

CROSS-REFERENCE TO RELATED APPLICATIONS

The present application is related to Singapore Patent Application No. 200605978-6, filed Aug. 31, 2006, entitled "MULTIMODE FILTER FOR DE-BLOCKING AND DE-RINGING". Singapore Patent Application No. 200605978-6 is assigned to the assignee of the present application and is hereby incorporated by reference into the present disclosure as if fully set forth herein. The present application hereby claims priority under 35 U.S.C. §119(a) to Singapore Patent Application No. 200605978-6.

TECHNICAL FIELD

The present disclosure generally relates to digital signal processing technologies, and more particularly to a flexi-standard filter with a multimode filter for high bit rate filtering applications, and a digital signal encoder/decoder having the flexi-standard filter, and further to methods for performing high bit rate filtering of digital signals including de-blocking and de-ringing.

BACKGROUND

Blocking effect and ringing noise are two well-known artifacts in low bit rate coded video. The blocking effect is the grid noise along block boundaries mainly visible in smooth areas, and the ringing noise shows along object borders. Traditionally, de-blocking filters try to remove the unwanted boundaries between adjacent blocks by low-pass filtering applied to pixels on both sides of the block borders. However, this type of filtering may introduce undesirable blurring effects when applied to pixels which belong to real image edges. The decision between edge and non-edge block borders relies on the assumption that real edges have higher amplitude than borders produced by the quantization of DCT coefficients. One method used to remove the ringing noise along object borders is to detect the edges in each frame, and apply a smoothing filter along these edges.

De-blocking and de-ringing are important video processing techniques used to remove coding artifacts and improve visual quality when rendering low bit rate coded video. Overlap smoothing and in-loop de-blocking are inter-block filtering techniques applied in video encoding standards to offset the effect of block encoding. Few video filtering algorithms are able to run in real time without customized hardware or high speed processor because they are computationally intensive.

FIG. 13 is a schematic view of the architecture of a known deblocking filter. The deblocking filter 1 comprises an External RAM 2, a System bus 3, a Ram1 4, a Ram0 5, a Ram2 6, a deblocking filter 7, control parameters 8, and a controller 9. In operation, the input pixel data of the deblocking filter come from two modules: the Ram2 6 for unprocessed pixel data of the current MB from the prior modules in the pipeline (e.g., inverse transformation, motion compensation and intra prediction), and the Ram0 5 for the adjacent pixel data of the top and left MBs of the current MB.

When needed, the Ram0 5 is loaded with needed pixel data from the External RAM 2 via the System bus 3 in advance. The Control parameters 8 and the Controller 9 provide instructions for the filtering process. The processing results are then sent into the Ram1 4 with the pixel data of current MB and the Ram0 5 with the adjacent pixel data of the top and the left MBs. After deblocking filtering, processed data in the Ram1 4 and Ram0 5 have to be stored back to the External RAM 2.

To add to the complexity of the filtering algorithms, some of these filtering techniques are applied concurrently during video encoding or decoding. For example, overlap smoothing and in-loop de-blocking can occur during the decoding of VC-1 bitstreams; both de-blocking and de-ringing can be applied after the decoding of MPEG-4 bitstreams; and de-blocking can be performed as a post-processing technique in addition to in-loop de-blocking in H.264. Conventional solutions that have individual hardware block for each filtering application are costly in terms of area and bandwidth.

One known multi-DSP system has a main DSP operating concurrently with an auxiliary DSP for implementing a filter algorithm. The DSPs have separate program memories in which the main DSP downloads filter process instructions to auxiliary program memory. They share the same data memory but priority is given to the main DSP.

Another known system implements de-blocking and de-ringing by splitting the frame into rectangular slices which are processed by 4 processing elements simultaneously, each of which has data level and instruction level parallelism. Data transfer between the local processing element data memory and the external memory is performed in the background by a powerful DMA engine. Both require additional high speed processors to operate in parallel for a software solution. Depending on the complexity of the filtering, a number of additional processors may be required. This increases area for additional cores and programs memories and adds complexity for arbitration.

One known filter accelerator, connected in parallel with a conventional DSP, enhances the speed of filtering operations in DSP by calculating and maintaining partial results based on selected prior data samples, freeing the DSP to perform other operations. However, this will not meet real time requirements for both sets of video post-filtering techniques.

Another known hardware architecture is one that may be embedded in DSP with special instructions to accelerate adaptive de-blocking filter of H.264/AVC video coding. Its building blocks include a dedicated data buffer, instruction decoder and controller, transpose model and edge filter with compact data access. However, this is not generic enough to support filtering algorithms other than de-blocking filtering.

Another known digital signal processing arrangement comprises a memory area, a signal processing module and a direct memory access controller for coordinating data transmission between the signal processing module and memory area.

For the implementation of a filter that supports post or in-loop filtering in different standards, the complexity of the filtering algorithms, besides the arithmetic parts, is further aggravated by excessive I/O overheads in loading data required in different standards for processing. These overheads are contributed by several factors discussed below and they impair the filter co-processor to accelerate the filtering process and reduce efficiency in continuity between consecutive filtering processes.

One of the factors is that different natures of de-blocking and de-ringing algorithms that require different data handling for efficient filtering. De-blocking is performed across block boundaries while de-ringing is block-based. The same data access pattern for de-blocking may not be suitable for de-ringing. Conventional block boundary filtering has typical arrangement of two 4×4 blocks beside the block boundary.

For block-based filtering that requires surrounding pixels, the arrangement brings about excessive read and write operations.

In addition, the operation of de-blocking is two one-dimensional filtering, one vertical and the other horizontal, one after the other. Whereas for de-ringing, the operation is usually one-dimensional. Current digital signal processors have efficient data interface and filtering in one-dimensional only. For two-dimensional filtering, data has to be rearranged prior to input into the filter function and post-arranged for storage to memory.

Finally, there is a trend in video consumer products towards supporting multiple video standards for video encoding and decoding applications. Thus, in addition to the traditional hardware solutions, it is more desirable to have a software solution that is flexible enough to support different video standards.

SUMMARY

Embodiments of the present disclosure generally provide a flexi-standard filter and method for processing digital signal data, especially pixel data of, for example, digital pictures.

In one embodiment of the present disclosure, there is provided a multimode filter for processing of digital video signals. In the embodiment, the multimode filter comprises a pixel memory for storing input pixel data to be processed and output pixel data that have been processed; a multimode filter pipeline electronically coupled to the pixel memory; and a local multimode filter control electronically coupled to the multimode filter pipeline, wherein the local multimode filter control receives task definitions from a source, decodes the task definitions, and generates signals to control operations of the multimode filter pipeline; whereby when the multimode filter pipeline receives the control signals from the local multimode filter control, it selects the input pixel data from the pixel memory, processes the selected pixel data according to the task definitions, and outputs the processed pixel data to the pixel memory.

In another embodiment of the multimode filter, the processing of the selected pixel data includes post-processing (de-blocking and de-ringing), in-loop processing (de-blocking and de-ringing), and overlap smoothing. In a further embodiment of the multimode filter, the de-blocking is performed on an n-pixel block edge, wherein n is an integer. In yet another further embodiment of the multimode filter, the de-ringing is performed on an n×n pixel block, wherein n is an integer.

In another embodiment of the multimode filter, the pixel memory is a RAM or a 2D register bank that has a fully configurable assembly of registers with addressing logic that selects required pixel data in one or two dimensions. In a further embodiment of the multimode filter, the pixel memory comprises an I/O interface for receiving input pixel data from a working memory and sending processed pixel data to the working memory.

In another embodiment of the multimode filter, the task definitions include the selection of input/output pixel data and filter logic to be performed.

In another embodiment of the multimode, the multimode filter pipeline comprises N filtering stages, where the N is an integer; wherein the N filtering stages allow a serial combination of operations on the same pixel data, and splitting of complex operation into N stages for satisfying the timing considerations of filter logics. In a further embodiment of the multimode filter, each filtering stage comprises a logic circuit and a flip flop. In another further embodiment of the multimode filter, the multimode filter pipeline further comprises a starting addressing logic for starting the pipeline for selecting the input pixel data from the pixel memory, wherein the starting addressing logic is disposed between the pixel memory and the first filtering stage; and an ending addressing logic for ending the pipeline for outputting the filtered data back to the pixel memory, wherein the ending addressing logic is disposed between the last filtering stage and the pixel memory.

In another embodiment of the multimode filter, the local multimode filter control operates the multimode filter pipeline in a pipeline control mode whereby the pixel memory has not been cleared after the last write of the filtered data back to the memory controller. In a further embodiment of the multimode filter, during the pipeline control mode, some pixel data from the last few load cycles for a current task definition are shuffled to the position as the pixel data in the first few load cycles for a next task definition, resulting in data continuity between the current and next task definitions.

Another embodiment of the present disclosure provides a flexi-standard filter for processing digital video signals. The flexi-standard filter comprises a digital signal processor; a memory controller; a line memory; and a multimode filter; wherein the digital signal processor controls (DSP) the overall sequence of the flexi-standard filter, makes filtering decisions, and programs the memory controller with filtering tasks; wherein the memory controller receives from the DSP the filtering tasks, fetches the data directly from the line memory, and sends the data and task definition to the multimode filter; wherein the line memory stores locally the working window, and several lines of the luminance and chrominance data that are immediately above the current processed row and that are required in the processing of the current row; and wherein the multimode filter performs the filtering task according to the programmed task definition in several iterations and writes the filtered data back to the memory controller; thereby the memory controller then re-directs the filtered data to the line memory.

In another embodiment of the flexi-standard filter, the DSP comprises a programmable core for executing logic and simple arithmetic instructions and performing data transfer operations; an optimum instruction memory cache (IMEM) for storing instructions to be given to the memory controller; and a data memory cache (DMEM) for storing input data to be transferred to the memory controller. In another embodiment of the flexi-standard filter, the DSP is a generic processor or a power processor.

In another embodiment of the flexi-standard filter, the line memory is a memory chip that is totally separated from the DSP. In yet another embodiment of the flexi-standard filter, the line memory is an embedded memory within the DSP but is controlled by the memory controller.

In another embodiment of the flexi-standard filter, the multimode filter operates in parallel with the DSP and is under the sole control of the memory controller. In another embodiment of the flexi-standard filter, the multimode filter comprises a pixel memory for storing input pixel data to be processed and output pixel data that have been processed; a multimode filter pipeline electronically coupled to the pixel memory; and a local multimode filter control electronically coupled to the multimode filter pipeline, wherein the local multimode filter control receives task definitions from a source, decodes the task definitions, and generates signals to control operations of the multimode filter pipeline; whereby when the multimode filter pipeline receives the control signals from the local multimode filter control, it selects the input pixel data from the pixel memory, processes the selected pixel data according to the task definitions, and outputs the processed pixel data to the pixel memory.

In another embodiment of the flexi-standard filter, the step of processing of the selected pixel data includes post-processing (de-blocking and de-ringing), in-loop processing (de-blocking and de-ringing), and overlap smoothing. In a further embodiment of the flexi-standard filter, the de-blocking is performed on an n-pixel block edge, wherein n is an integer. In another further embodiment of the flexi-standard filter, the de-ringing is performed on an n×n pixel block, wherein n is an integer. In another further embodiment of the flexi-standard filter, the pixel memory is a RAM or a 2D register bank that has a fully configurable assembly of registers with addressing logic that selects required pixel data in one or two dimensions. In another further embodiment of the flexi-standard filter, the pixel memory comprises an I/O interface for receiving input pixel data from a working memory and sending processed pixel data to the working memory.

In another embodiment of the flexi-standard filter, the task definitions include the selection of input/output pixel data and filter logic to be performed.

In another embodiment of the flexi-standard filter, the multimode filter pipeline comprises N filtering stages, where the N is an integer; wherein the N filtering stages allow a serial combination of operations on the same pixel data, and splitting of complex operation into N stages for satisfying the timing considerations of filter logics. In a further embodiment of the flexi-standard filter, each filtering stage comprises a logic circuit and a flip flop.

In another embodiment of the flexi-standard filter, the multimode filter pipeline further comprises a starting addressing logic for starting the pipeline for selecting the input pixel data from the pixel memory, wherein the starting addressing logic is disposed between the pixel memory and the first filtering stage; and an ending addressing logic for ending the pipeline for outputting the filtered data back to the pixel memory, wherein the ending addressing logic is disposed between the last filtering stage and the pixel memory.

In another embodiment of the flexi-standard filter, the local multimode filter control operates the multimode filter pipeline in a pipeline control mode whereby the pixel memory has not been cleared after the last write of the filtered data back to the memory controller. In a further embodiment of the flexi-standard filter, during the pipeline control mode, some pixel data from the last few load cycles for a current task definition are shuffled to the position as the pixel data in the first few load cycles for a next task definition, resulting in data continuity between the current and next task definitions.

Another embodiment of the present disclosure provides an electronic device with a decoder for processing digital video signals. The electronic device comprises an entropy decoder circuitry for decoding an input of encoded video bitstreams to extract video header parameters and video coefficients; an inverse quantizer circuitry for inversed quantizing the coefficients; an inverse transform circuitry for converting the video coefficients to the pixels values; a motion compensation circuitry for motion compensating inter-pixel data by reference motion vectors; and a flexi-standard filter for in-loop processing (de-blocking and de-ringing), post-processing (de-blocking and de-ringing), and overlap smoothing, wherein the flexi-standard filter comprises a digital signal processor; a memory controller; a line memory; and a multimode filter; wherein the digital signal processor controls (DSP) the overall sequence of the flexi-standard filter, makes filtering decisions, and programs the memory controller with filtering tasks; wherein the memory controller receives from the DSP the filtering tasks, fetches the data directly from the line memory, and sends the data and task definition to the multimode filter; wherein the line memory stores locally the working window, and several lines of the luminance and chrominance data that are immediately above the current processed row and that are required in the processing of the current row; and wherein the multimode filter performs the filtering task according to the programmed task definition in several iterations and writes the filtered data back to the memory controller; thereby the memory controller then re-directs the filtered data to the line memory.

In another embodiment of the electronic device with a decoder, the electronic device is a Set-Top-Box, Digital TV, DVD Player, DVD Recorder, PC, notebook, PDA, or mobile phone.

Another embodiment of the present disclosure provides an electronic device with an encoder for processing digital video signals. The electronic device comprises a motion estimation circuitry for deriving reference motion vectors that represent the temporal correlation between the current picture and reference picture; a transform circuitry for converting the intra or inter pixel values to coefficients that are more efficient in energy packing and de-correlation; a quantizer circuitry for quantizing the coefficients; an entropy encoder circuitry for encoding video coefficients and video header parameters to output encoded video bitstreams; an inverse quantizer circuitry for inversed quantizing the coefficients of the reference picture; an inverse transform circuitry for converting the video coefficients of the reference picture to pixels values; and a flexi-standard filter for in-loop processing of reference pictures (de-blocking and de-ringing), pre-processing (de-blocking and de-ringing for the case of re-encoding purposes), and overlap smoothing, wherein the flexi-standard filter comprises a digital signal processor; a memory controller; a line memory; and a multimode filter; wherein the digital signal processor controls (DSP) the overall sequence of the flexi-standard filter, makes filtering decisions, and programs the memory controller with filtering tasks; wherein the memory controller receives from the DSP the filtering tasks, fetches the data directly from the line memory, and sends the data and task definition to the multimode filter; wherein the line memory stores locally the working window, and several lines of the luminance and chrominance data that are immediately above the current processed row and that are required in the processing of the current row; and wherein the multimode filter performs the filtering task according to the programmed task definition in several iterations and writes the filtered data back to the memory controller; thereby the memory controller then re-directs the filtered data to the line memory.

In another embodiment of the electronic device with an encoder, the electronic device is a Set-Top-Box, Digital TV, DVD Player, DVD Recorder, PC, notebook, PDA, or mobile phone.

Another embodiment of the present disclosure provides a process for digital signal processing. The process comprises receiving digital signal data and storing the received digital signal data in a local memory; receiving processing parameters and code instructions and storing the received processing parameters and code instructions in a digital signal processor; forming task definitions from the processing parameters and code instructions within the digital signal processor that outputs the task definitions to a memory controller; transmitting the digital signal data by the memory control according to the task definitions to a multimode filter; processing the digital signal data by the multimode filter according to the task definitions; and outputting the processed digital signal data to the local memory or an external memory.

In another embodiment of the process, the step of receiving digital signal data comprises receiving the digital signal data after the digital signal data have gone through motion compensation.

In another embodiment of the process, the step of receiving processing parameters and task definitions comprises receiving the processing parameters from a FIFO control interface and the code instructions from a control bus.

In another embodiment of the process, the step of storing the received processing parameters and code instructions in a digital signal processor comprises storing the received processing parameters and code instructions into different memory locations within the digital signal processor.

In another embodiment of the process, the step of processing the digital signal data by the multimode filter according to the task definitions comprises in-loop processing (de-blocking and de-ringing), post processing (de-blocking and de-ringing), and overlap smoothing. In a further embodiment of the process, the step of processing the digital signal data by the multimode filter according to the task definitions comprises using a fully configurable assembly of 2D register bank to store the digital signal data so that the multimode filter can perform in-loop processing (de-blocking and de-ringing), post processing (de-blocking and de-ringing), and overlap smoothing according to the task definitions.

In another embodiment of the process, the step of outputting the processed digital signal data to the local memory or an external memory comprises storing certain information that can be used for next process into the memory of the multimode filter so that the read/write cycle time can be saved.

Other technical features may be readily apparent to one skilled in the art from the following figures, descriptions and claims.

BRIEF DESCRIPTION OF THE DRAWINGS

For a more complete understanding of this disclosure and its features, reference is now made to the following description, taken in conjunction with the accompanying drawings, in which.

DETAILED DESCRIPTION

The present disclosure may be understood more readily by reference to the following detailed description of certain embodiments of the disclosure. Throughout this application, where publications are referenced, the disclosures of these publications are hereby incorporated by reference, in their entireties, into this application in order to more fully describe the state of art to which this disclosure pertains.

Disclosed embodiments of the present disclosure generally provide a flexi-standard filter and method for processing digital signal data, especially pixel data of digital pictures. To support different filtering algorithms with different complexity in encoding and decoding video in real time, the flexi-standard filter has sufficient flexibility to accommodate various filtering processes including in-loop filtering of various standards and proprietary post-processing algorithms and yet is able to meet the real time requirements of concurrent smoothing, de-blocking and de-ringing algorithms. These embodiments allow for efficient data processing and reduces unnecessary data I/O overheads, thus reducing the complexity of the filtering algorithm significantly to meet real time requirements.

Figure 1:
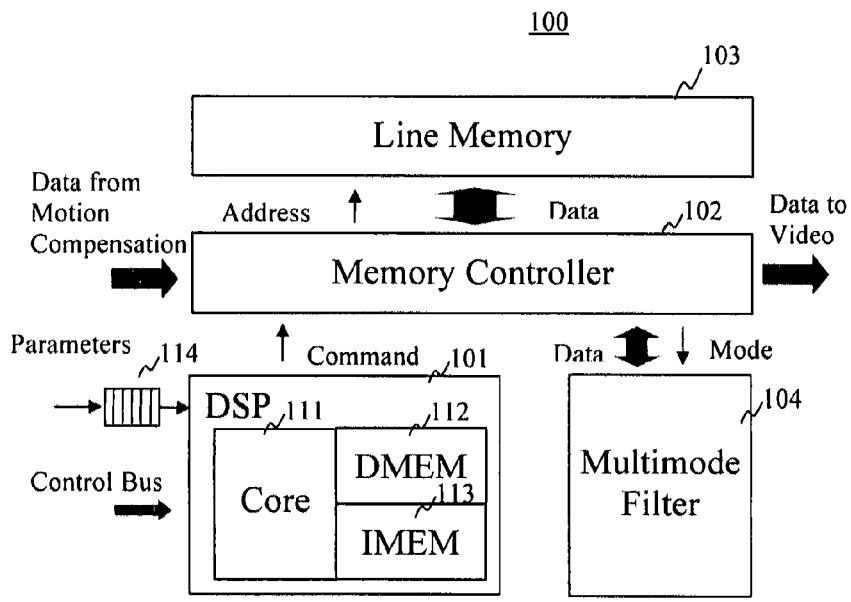
FIG. 1 shows a functional block diagram of a flexi-standard filter in accordance with one embodiment of the present disclosure.

Referring to FIG. 1, there is provided a functional block diagram of a flexi-standard filter in accordance with one embodiment of the present disclosure. The flexi-standard filter 100 comprises a digital signal processor 101, a memory controller 102, a line memory 103, and a multimode filter 104. Briefly, the digital signal processor (DSP) 101 controls the overall sequence of the flexi-standard filter, makes filtering decisions, and programs the memory controller 102 with filtering tasks. The memory controller 102 receives from the DSP 101 the filtering tasks, fetches the data directly from the line memory 103, and sends the data and task definition to the multimode filter 104. The multimode filter 104 performs the filtering task according to the programmed task definition in several iterations and writes the filtered data back to the memory controller 102. The memory controller 102 then re-directs the filtered data to the line memory 103 and/or displays processes in the pipeline after the filtering process.

The digital signal processor (DSP) 101 is the master controller for the high level control of the flexi-standard filter. The DSP 101 comprises a programmable core that can at least execute logic and simple arithmetic instructions and can perform data transfer operations via its bus interfaces, give instruction, and function as data memories. More specifically, the DSP 101 receives via the FIFO control interface 114 the information including pixel data of pictures, and slice and MB-level parameters for setting up the flexi-standard filter for example the coded block flags from an entropy decoder. The DSP 101 also makes decisions at MB-level about which edge to be filtered and what strength to be used, and defines the filter task commands to the memory controller 102. In one embodiment, the DSP 101 may be any generic processor. It preferably includes a logic and I/O efficient core 111, an optimum instruction memory cache IMEM 112, and a data memory cache DMEM 113. The IMEM 112 is an internal instruction cache that stores the code instructions for the DSP 101. The DMEM 113 is an internal data cache of the DSP 101, and used to store data used by the DSP computation. Both are accessible via the control bus. In another embodiment, the DSP 101 may be a power processor sharing the computation with other blocks for example the entropy decoder.

The line memory 103 stores locally the working window, and several lines of the luminance and chrominance data that are immediately above the current processed row and that are required in the processing of the current row; thus it reduces the bandwidth load of fetching and storing the data from and to an external memory. In one embodiment, the line memory 103 procures motion-compensated data from the motion-compensation block 804 (see FIG. 8), stores the procured data for later processing within the multimode filter 104, and feeds the processed data to external memory or display. Structurally, the line memory 103 may be an embedded memory within the same chip of the DSP 101 but is controlled by memory controller 102. Because the line memory is only used for the flexi-standard filter, it may be considered as a dedicated local memory.

Figure 6:
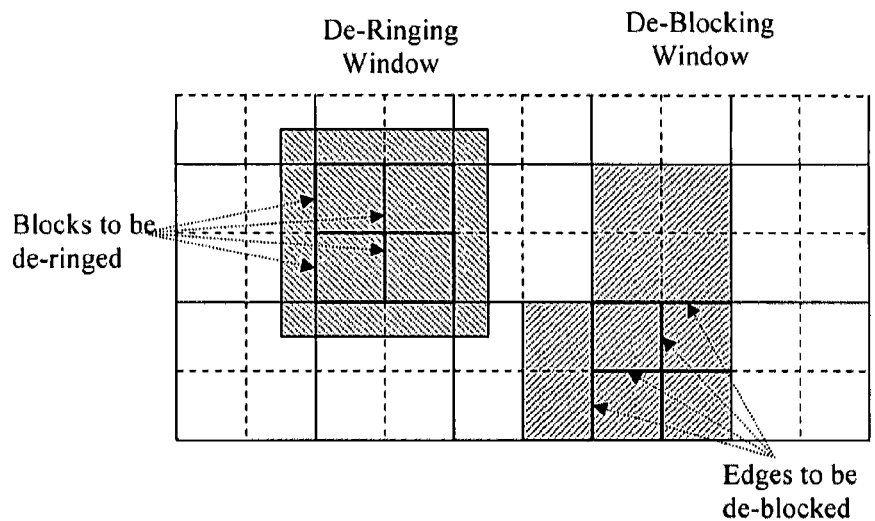
FIG. 6 illustrates exemplary working windows for concurrent MPEG-4 de-blocking and de-ringing operations within a macroblock in accordance with one embodiment of the present disclosure.
Figure 7:
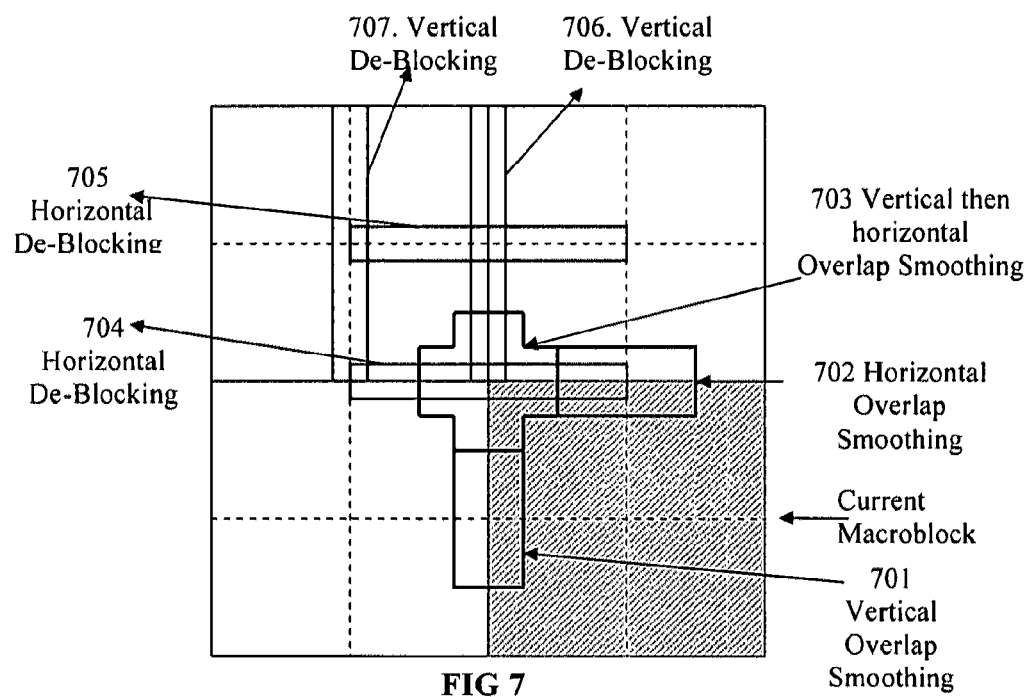
FIG. 7 illustrates another exemplary operation sequence of VC-1 overlap smoothing and de-blocking for luminance data in an intra-macroblock of an I-picture within the same working window in accordance with one embodiment of the present disclosure.

The local line memory 103 enables the flexi-standard filter 100 to concurrently execute filtering algorithms. FIG. 6 illustrates exemplary working windows for concurrent MPEG-4 de-blocking and de-ringing operations within a macroblock in the line memory 103. FIG. 7 illustrates another exemplary operation sequence of VC-1 overlap smoothing and de-blocking for luminance data in an intra-macroblock of an I-picture within the same working window. As shown in FIG. 7, the macroblocks to the top and left of the current macroblock have already been partially filtered. Vertical overlap smoothing 701 is first performed followed by horizontal overlap smoothing 702. A special block "cross-like" structure 703 may preferably be used for vertical, then horizontal overlap smoothing for block corners. Then, horizontal de-blockings 704, 705 are performed followed by vertical de-blockings 706, 707.

The memory controller 102 provides the routing of all pixel data to and from the line memory 103, and the multimode filter 104. It also receives input from external resources such as a motion compensation block of a decoder, and outputs the processed digital data to the video display block and/or extended external memory for partially filtered data. It further receives from the DSP 101 the multiple task queues for different operating functions including a dedicated task queue for the control of the multimode filter 104 that stores task definitions from the DSP 101. Upon a non-empty signal, a task definition is first read from the task queue and data are requested from the line memory 103 or external memory. A command mode is subsequent issued to the multimode filter together with the associated data, and filtered data are finally sent to the line memory 103 or external memory for storing. The memory controller 102 executes the remaining task definitions in FIFO manner as soon as the previous task is completed and the data source or sink are able to provide or accept data.

The multimode filter 104 operates in parallel with the DSP 101 under the sole control of the memory controller 102. As a co-processor to the DSP 101, the multimode filter 104 executes the operations of de-blocking and/or de-ringing according to task definitions from the memory controller 102. For example, it performs the de-blocking filters specified in the H.264 standards, and post-processing filters applied after MPEG-4 decoding. Post-processing reference therein shall be made with respect to the recommended de-blocking and de-ringing filters in MPEG-4 specifications. It is obvious to those skilled in the art that other post-processing techniques may be used.

Figure 2:
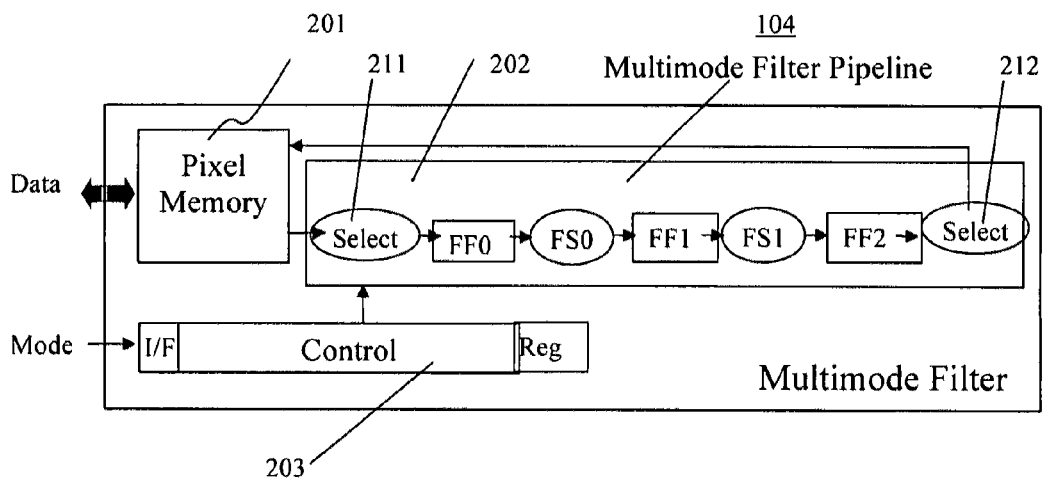
FIG. 2 shows a functional block diagram of the micro-architecture of the multimode filter in accordance with one embodiment of the present disclosure.

Referring to FIG. 2, there is provided a functional block diagram of the micro-architecture of the multimode filter in accordance with one embodiment of the present disclosure. The multimode filter 104 comprises a pixel memory (e.g., a register bank) 201, a multimode filter pipeline 202, and a local multimode filter control 203. The pixel memory 201 receives input pixel data from and sends output pixel data to a working memory (e.g., the line memory 103) via the memory controller 102; the multimode filter pipeline 202 receives operation control signals from the local multimode filter control 203 and input pixel data from the pixel memory 201, performs filtering processes of the input pixel data according to the operation control signals, and outputs the processed pixel data to the pixel memory 201; and the local multimode filter control 203 receives task definitions from the memory controller 102 and generates operation control signals for the multimode filter pipeline 202. While the line memory 103 could be embedded static/dynamic RAM, the pixel memory 201 must be fully configurable, typically assembled from registers. Data fetched from the line memory 103 are first stored in the pixel memory 201, re-arranged and fed through the filter pipeline 202, and re-arranged prior to output t the line memory 103.

The multimode filter 104 is so configured as to ensure continuity between consecutive filtering processes. It is programmed indirectly by the DSP 101 with filtering processes being generic and data rich in nature, and has all filtering decisions above pixel level specific to video standard left to be performed by the DSP 101 with the logic and I/O efficient core 111. In addition, the multimode filter 104 does not use an internal cache; instead it accesses data and receives instructions efficiently via a dedicated direct memory access controller, thus eliminating data transfer latency.

In one embodiment, the pixel memory 201 has an 8 to 10 pixel wide interface used to receive data from the line memory 103 and send filtered data to the line memory 103. In addition, the pixel memory 201 serves as a storage buffer for both input pixel data that are selected for filtering subtasks and output filtered pixel data that result from the completion of the filtering subtasks.

Figure 3:
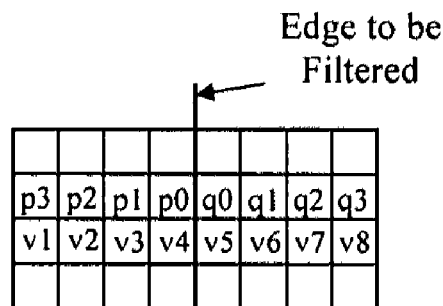
FIG. 3 is a graphic illustration of the minimum 2D configuration of the pixel memory for inter-block de-blocking filtering in accordance with one embodiment of the present disclosure.
Figure 4:
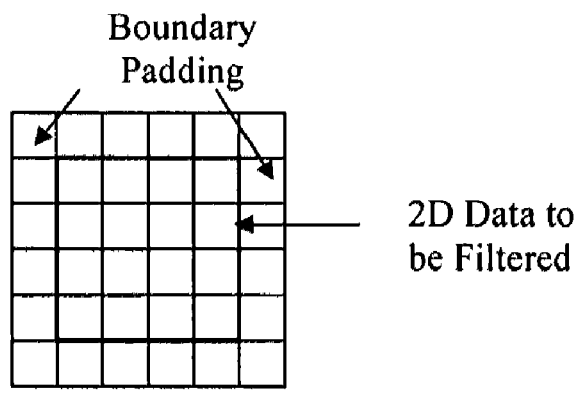
FIG. 4 is a graphic illustration of the minimum 2D configuration of the pixel memory for intra-block de-ringing filtering in accordance with one embodiment of the present disclosure.

The pixel memory 201 may be a random access memory (RAM) or a 2D register bank with addressing logic that selects required pixel data in one or two dimensions. In addition, the pixel memory 202 is configurable for both intra-block filtering and inter-block filtering. A configurable arrangement of the register bank leads to efficient intra and inter block processing. The filter tasks are defined by the most efficient atomic operation, a four-pixel block edge for the de-blocking filter and a 4×4 pixel block for the de-ringing filter. An atomic operation of 4 pixel edges in de-blocking requires at least 32 pixels with each pixel edge requiring 8 input pixels. FIG. 3 shows the minimum 2D configuration for inter-block de-blocking filtering. The 4×4 blocks to the left and right (or top and bottom) of the pixel edge are fetched and kept in the pixel memory. On the other hand, an atomic operation of 4×4 pixel block in de-ringing requires at least 36 pixels with 3×3 input pixel window per filtered pixel. FIG. 4 shows the minimum 2D configuration for intra-block de-ringing filtering. The 4×4 block of interest requires the block boundary of at least one pixel wider to form a 6×6 pixel block per atomic operation. A minimum register bank size of 288 flip flops is required to accommodate both atomic operations of intra and inter block filtering.

Figure 5:
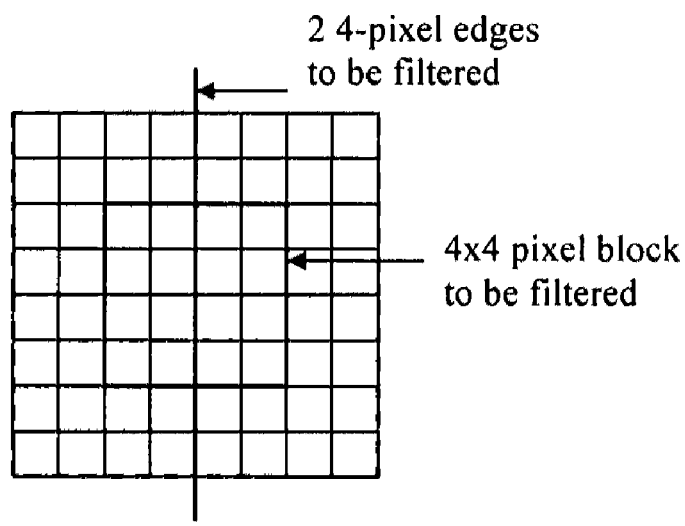
FIG. 5 is a graphic illustration of another 2D configuration of the pixel memory for inter-/intra-block filtering in accordance with one embodiment of the present disclosure.

FIG. 5 provides another embodiment for the configurable pixel memory. The arrangement supports two atomic operations of 4 pixel edges in de-blocking for decoders with higher data rates for example high definition video. On the other hand, the pixel memory can be re-configured to support an atomic operation of 4×4 block in de-ringing with the advantage of higher re-use of data across de-ringing operations in pipeline control mode.

The multimode filter pipeline 202 comprises N filtering stages, where the N is an integer. The N filtering stages with logic and buffer combine sequential arithmetic calculations and split complicated filtering into simple operations. In one embodiment as shown in FIG. 2, N is 2. The multimode filter pipeline 202 with two filtering stages comprises two logic circuits FS0 and FS1 that are buffered separately by three series of flip flops FF0, FF1, and FF2. The buffer pipeline allows for serial combination of operations on the same pixel data, saving clock cycles than conventional serial execution of operations. The cycle saving does not translate to increase in hardware cost when the most complex operation will give the worst-case, i.e., most complex filtering stages. And combining two simple operations in serial mode may not be as complicated as the most complex operation. The buffer pipeline also allows for splitting of complex operation into two stages so that timing considerations of filter logic can be met. The multimode filter pipeline 202 further comprises two addressing logics 211, 212, where the addressing logic 211 starts the pipeline for selecting input data from the pixel memory 201, and the addressing logic 212 ends the pipeline for outputting the filtered data back to a specific location on the pixel memory 201.

The local multimode filter control 203 receives task definitions from the memory controller 102 on the mode of filtering to be performed, decodes the task definitions, and generates signals to control operations of the multimode filter pipeline 202 such as the pixel selection and the filter logic performed. In one embodiment, the local multimode filter control 203 comprises three parts: interface (I/F), logic (control), and buffer (reg). The logic (control) decodes the task definition and generates signals to control operations of multimode filter pipeline. It is typically made up of finite state machine (FSM). Additional registers may be present to store intermediate control results computed during earlier filtering process and used in subsequent filtering process within the same task definition or across 2 task definitions. The interface I/F handles the communication protocol between the memory controller and the multimode filter.

A pipeline control mode links consecutive task definitions with data shuffling that reduces data load and write from and to external memory. The local multimode filter control 203 can operate the multimode filter pipeline 202 in the pipeline control mode whereby the pixel memory 201 has not been cleared after the last write of the filtered data back to the memory controller 202. During the pipeline control mode, some pixel data from the last few load cycles for the current task definition are shuffled to the position as the pixel data in the first few load cycles for the next task definition, resulting in data continuity between the current and next task definitions. By so doing, it is to ensure that pixel data loaded into the pixel memory 201 for two consecutive task definitions have a minimal overlap, hence saving read cycles. The same pipeline control mode can be applied to the filtered data to save write cycles. Some filtered data from last few processing cycles from current task definition, not belonging to the same memory entity of the rest of the filtered data, may be shuffled to the position of next write and combined with part of filtered data from the same memory entity in the next task definition. Since the memory entity for the filtered data is completed before sending to line memory, writing cycles are saved.

The flexi-standard filter 100 is so configured with a local memory (e.g., the line memory 103) that concurrent filtering techniques (e.g., overlap smoothing and in-loop de-blocking in VC-1, de-blocking and de-ringing in MPEG-4, and in-loop de-blocking and post-processing in H.264) can be executed within the same unit by re-scheduling the filtering operations and sharing working windows within the line memory, thus minimizing the bandwidth between external memory and the filters and saving area costs.

Furthermore, the DSP 101 does not control the multimode filter 104 directly; instead the memory controller 102 controls the operation of the multimode filter 104 by serving data and command transfer tasks from dedicated task queues filled by the DSP 101. Therefore, the computing resource of the DSP 101 is freed immediately after programming the multimode filter 104, and the multimode filer 104 can be efficiently utilized with the memory controller 102 as direct memory access.

In addition, the embedded core 111 enables the flexi-standard filter 100 to be configured for different in-loop filtering and post processing. The localized line memory 103 enables concurrent overlap smoothing and in-loop de-blocking instead of separate entities, and concurrent de-blocking and de-ringing. The customized multimode filter allows increased performance for data crunching operations compared to a generic digital signal processor and yet the software interface and generic micro-architecture of the multimode filter maintain the flexibility required for differing filtering operations compared to a specialized de-blocking coprocessor.

An embodiment of the present disclosure may be applied to the in-loop filtering processes like de-blocking in video encoders and decoders for H.263, H.264, and VC-9 and post processing of decoded video for example MPEG-1, MPEG-2, and MPEG-4 to remove coding artifacts and improve visual quality of decoded video.

More importantly, the multimode filter 104 is designed to support a variety of filtering techniques suitable for multi-standard video encoders and decoders. In the decoding process, the multimode filtering process is applied after motion compensation and before video display and uses as a reference picture for motion compensation in the case of in-loop filtering on I- or P-picture. Similarly in the encoding process, it is applied after motion compensation and picture reconstruction for the I-, P-picture only, in the hybrid loop and before being used as a reference picture for motion estimation.

Figure 8:
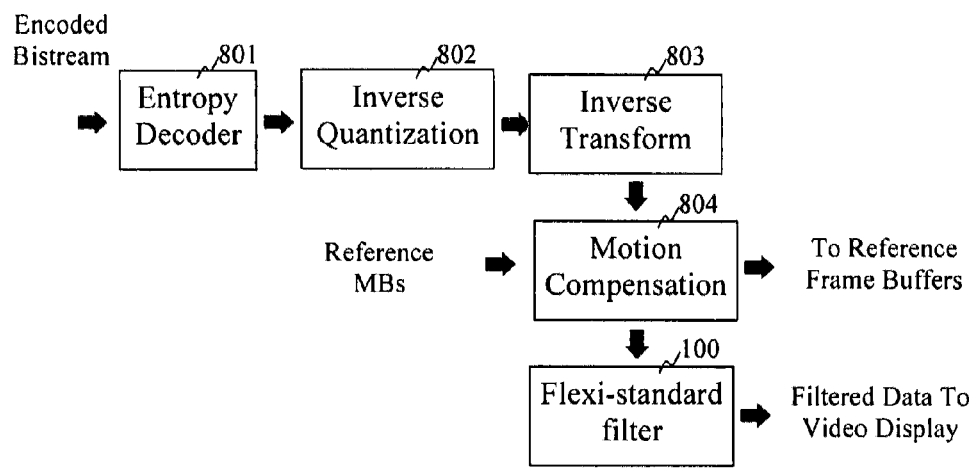
FIG. 8 shows a functional block diagram of a decoder with the flexi-standard filter in accordance with one embodiment of the present disclosure.

Now referring to FIG. 8, there is provided a functional block diagram of a decoder with a flexi-standard filter of an embodiment of the present disclosure. Reference therein shall be made to flexible MPEG-4 and H.264 decoding unless otherwise stated. It is obvious to those skilled in the art that the same procedures may be used in in-loop filtering of VC-9 and H.263, proprietary post-filtering algorithms with MPEG-1, MPEG-2 bitstreams. Furthermore, the flexi-standard filter of the embodiment of the present disclosure is applicable for any suitable encoder for performing the inter-block and intra-block filtering. The encoder/decoder can be embedded in any suitable electronic devices including set-top boxes, digital TVs, DVD players and recorders, PC, notebook, PDA, mobile phone, and the like.

The encoded video MPEG-4 or H.264 bitstreams are decoded by the entropy decoder block 801 to extract video header parameters and video coefficients. Reverse 3D Huffman coding or reversible variable length coding is performed in MPEG-4 while either reverse content-based adaptive binary arithmetic coding (CABAC) or 2D universal variable length coding is performed in H.264.

The video coefficients are then inversed quantized by the inverse quantizer block 802 and inverse transformed by the inverse transform block 803 to obtain intra or inter pixel data. Inverse discrete cosine transform (IDCT) is performed in MPEG-4 while either IDCT or inverse integer transform is performed in H.264.

The inter-pixel data are then motion compensated by the reference motion vectors in motion compensation block 804, while the intra-pixel data remain. The pixel data for I- and P-pictures in MPEG-4 or H.264 are stored as reference frames for subsequent motion compensation of P- or B-pictures.

However, if in-loop filtering flag is turned on in H.264, prior to storage in reference buffers, the pixel data for I- and P-pictures may be de-blocked in the flexi-standard filter 100. On one hand, the motion compensated data for MPEG-4 or H.264 without in-loop filtering may be de-blocked and de-ringed in the flexi-standard filter 100. On the other hand, the in-loop de-blocked data for I- and P-picture data may be further de-ringed in the flexi-standard filter 100. The output of the flexi-standard filter is sent to the video display or external memory.

Now there are provided three exemplary applications of the flexi-standard filter 100 of embodiments of the present disclosure.

One exemplary application of the flexi-standard filter 100 according to an embodiment of the present disclosure is its implementation in H.264 in-loop filtering. Initially, DSP 101 receives from its control interface the parameters including but not limited to:

Picture-level information like field_pic_flag, MbaffFrame-Flag;

Slice-level information like slice_type, filter_offset_A, filter_offset_B; and

Macroblock-level information like disable_deblocking_filter_idc, motion vectors, motion prediction type, macroblock coding mode and type (partition mode, intra/inter, field/frame), quantization parameter, macroblock address, coded block flags.

Then, using these information and position of the edge with respect to the macroblock, DSP 101 computes the boundary strength for each 4 pixel block boundary, sets boundary strength as zero for non-existent block boundary, and determines the alpha and beta values from the average quantization parameter and filter offsets. And then, DSP 101 determines the clipping filter value for the default filter using the boundary strength.

Finally, DSP 101 programs the task definitions in two 32-bit command words for each 4 pixel edge atomic operation in multimode filter specifying: (1) Beta and alpha values, $\alpha, \beta$; (2) Boundary strength, Bs; and (3) Clipping value. Modes of operation are distinguished by the indicator top_field_flag, frame_flag, chroma_flag, vertical_edge_flag.

The pixel memory 201 is configured as inter-block filtering and the filtering for the macroblock is completed in maximum 48 task definitions. The atomic filtering operation is simple. The first filtering stage is preferably reserved for local filtering within atomic operations based on input pixel data according to the Equations 1, 2a, 2b and 3 below.

$$\text{filter\_flag\_}p_0q_0 = (|p_0 - q_0| < \alpha) \&\& (|p_1 - p_0| < \beta) \&\& (|q_1 - q_0| < \beta) \quad \text{(Eqn. 1)}$$

$$\text{filter\_flag\_}p_1 = (|p_2 - p_0| < \beta) \&\& (|p_0 - q_0| < (\alpha >> 2 + 2)) \\ \|Bs \neq 4) \&\& \text{filter\_flag\_}p_0q_0 \quad \text{(Eqn. 2a)}$$

$$\text{filter\_flag\_}q_1 = (|q_2 - q_0| < \beta) \&\& (|p_0 - q_0| < \alpha >> 2 + 2) \\ \|Bs \neq 4) \&\& \text{filter\_flag\_}p_0q_0 \quad \text{(Eqn. 2b)}$$

$$\text{filter\_flag\_}p_2q_2 = (Bs = 4) \&\& \text{filter\_flag\_}p_0q_0 \quad \text{(Eqn. 3)}$$

In Equations 1-3, filter_flag_$p_0q_0$ is an indicator for filtering pixels $p_0$ and $q_0$, filter_flag_$p_1$ is an indicator for filtering pixel $p_1$, filter_flag_$q_1$ is an indicator for filtering pixel $q_1$ and filter_flag_$p_2q_2$ an indicator for filtering pixels $p_2$ and $q_2$. Refer to FIG. 3 for pixel positions. At the same time, the second filtering stage handles the actual default or strong filtering based on the boundary strength and the flags in the first stage.

Another exemplary application of the flexi-standard filter according to an embodiment of the present disclosure is its implementation in MPEG-4 de-blocking. The following description is a slight variation of the standard MPEG-4 de-blocking, considering only 8 pixels per pixel edge instead of 10 pixels. For implementation of 10 input pixels per pixel edge, it is obvious to those skilled in the art that the pixel memory could be modified to a configuration of 2 5×4 blocks.

In MPEG-4 de-blocking, there are no filter decisions to be made above atomic level. DSP 101 receives the quantization parameter and programs the required task definitions in a 32-bit command words for each 4 pixel edge atomic operation in the multimode filter 104 specifying a quantization parameter and two thresholds THR1 and THR2.

Figure 9:
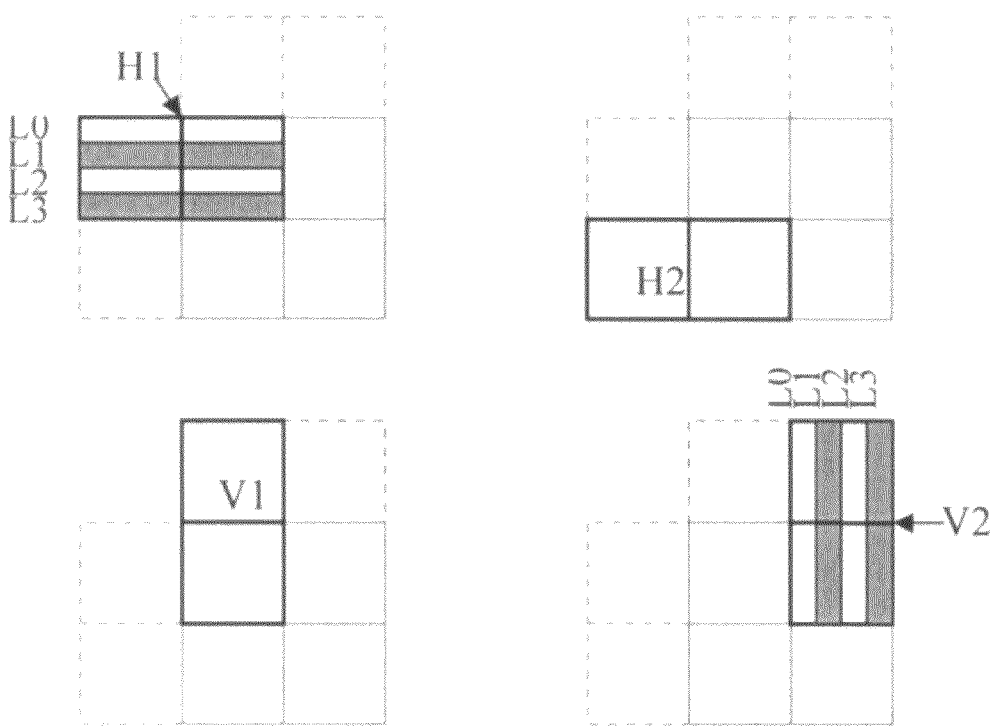
FIG. 9 illustrates an exemplary data flow arrangement of de-blocking in an 8×8 block in accordance with one embodiment of the present disclosure.

FIG. 9 shows an example data processing flow to the multimode filter 104 for performing de-blocking filtering in a 8×8 block where the edges are H1 H2, V1, and V2. The pixel memory is similarly configured as inter-block filtering for 2 8×8 blocks. The filtering for the macroblock is completed in maximum 24 task definitions.

The atomic operation consists of 2 functions per pixel edge. As the same pixel data is used, the need to reload the data is saved. The first function computes the filter type based on the threshold according to Equations 4-8 below and stores the result to control registers used in the second function.

$$\text{eq\_cnt} = \phi(v_1 - v_2) + \phi(v_2 - v_3) + \phi(v_3 - v_4) + \\ \phi(v_4 - v_5) + \phi(v_5 - v_6) + \phi(v_6 - v_7) + \phi(v_7 - v_8) \quad \text{(Eqn. 4)}$$

$$\phi(\gamma) = \begin{cases} 1 & |\gamma| \leq THR1 \\ 0 & |\gamma| > THR1 \end{cases} \quad \text{(Eqn. 5)}$$

$$\text{filter\_mode} = \begin{cases} DC\_offset & \text{eq\_cnt} \geq THR2 \\ \text{default} & \text{eq\_cnt} < THR2 \end{cases} \quad \text{(Eqn. 6)}$$

$$\text{max}v = \text{MAX}(v_1, v_2, v_3, v_4, v_5, v_6, v_7, v_8) \quad \text{(Eqn. 7)}$$

$$\text{min}v = \text{MIN}(v_1, v_2, v_3, v_4, v_5, v_6, v_7, v_8) \quad \text{(Eqn. 8)}$$

In the above Equations, $v_1$ to $v_8$ are pixels with positions defined in FIG. 3, eq_cnt is the number of absolute inter-pixel difference smaller than or equal to threshold THR1, filter_mode is the mode of de-blocking filtering employed, maxv is the maximum pixel value, minv is the minimum pixel value. For the default filter mode in the second function, the first filtering stage is preferably used for the computation of the frequency components according to Equations 9-11 below.

$$a_{3,0}=([2\ -5\ 5\ -2]\cdot[v_3\ v_4\ v_5\ v_6]^T)//8 \quad \text{(Eqn. 9)}$$

$$a_{3,1}=([2\ -5\ 5\ -2]\cdot[v_1\ v_2\ v_3\ v_4]^T)//8 \quad \text{(Eqn. 10)}$$

$$a_{3,2}=([2\ -5\ 5\ -2]\cdot[v_5\ v_6\ v_7\ v_8]^T)//8 \quad \text{(Eqn. 11)}$$

In Equations 9-11, $a_{3,0}$ $a_{3,1}$ and $a_{3,2}$ are intermediate anti-symmetric values of 4-pixel vectors. At the same time, the second filtering stage determines the filtered data according to Equations 12-16 below.

$$v'_4 = v_4 - d \quad \text{(Eqn. 12)}$$

$$v'_5 = v_5 - d \quad \text{(Eqn. 13)}$$

$$d = \text{clip}\ (5 \times (a'_{3,0} - a_{3,0})\ //\ 8,\ 0,\ \delta \times (v_4 - v_5)/2) \quad \text{(Eqn. 14)}$$

$$a'_{3,0} = \text{sign}\ (a_{3,0}) \times \text{MIN}(|a_{3,0}|, |a_{3,1}|, |a_{3,2}|) \quad \text{(Eqn. 15)}$$

$$\delta = \begin{cases} 1 & |a_{3,0}| < QP \\ 0 & |a_{3,0}| \geq QP \end{cases} \quad \text{(Eqn. 16)}$$

In Equations 12-16 above, $v_4'$ and $v_5'$ are filtered pixel values of $v_4$ and $v_5$, d is the pixel value change of $v_4$ and $v_5$, are $a_{3,0}'$ is the minimum absolute anti-symmetric value following the sign of $a_{3,0}$ and $\delta$ is a binary indication of anti-symmetric value $a_{3,0}$ less than QP and QP is the quantization parameter used for the current macroblock.

The atomic operation of VC-1 de-blocking is similar to the default filter mode in MPEG-4 de-blocking except that the filtering operation starts from the 3rd set of 8 pixels and no filtering is applied if $|a_{3,0}| \geq QP$ or $|a_{3,0}| < \text{MIN}(|a_{3,1}|, |a_{3,2}|)$ and the condition that no filtering is applied to any set if the $3^{rd}$ set is not filtered. In addition, the filtering decision for each 4 pixel edge is processed in DSP 101.

For the DC offset filter mode in the second function, it is activated under conditions $|\text{max}-\text{min}| < 2 \times QP$. The filtering requires two iterations per pixel edge. The first iteration computes four filtered values to the left while the second iteration computes four filtered values to the right of the edge according to Equations 17-24 below.

$$v_1'=(10v_1+2v_2+2v_3+v_4+v_5)//16 \quad \text{(Eqn. 17)}$$

$$v_2'=(6v_1+4v_2+2v_3+2v_4+v_5+v_6)//16 \quad \text{(Eqn. 18)}$$

$$v_3'=(4v_1+2v_2+4v_3+2v_4+2v_5+v_6+v_7)//16 \quad \text{(Eqn. 19)}$$

$$v_4'=(2v_1+2v_2+2v_3+4v_4+2v_5+2v_6+v_7+v_8)//16 \quad \text{(Eqn. 20)}$$

$$v_5'=(v_1+v_2+2v_3+2v_4+4v_5+2v_6+2v_7+2v_8)//16 \quad \text{(Eqn. 21)}$$

$$v_6'=(v_2+v_3+2v_4+2v_5+4v_6+2v_7+4v_8)//16 \quad \text{(Eqn. 22)}$$

$$v_7'=(v_3+v_4+2v_5+2v_6+4v_7+6v_8)//16 \quad \text{(Eqn. 23)}$$

$$v_8'=(v_4+v_5+2v_6+2v_7+10v_8)//16 \quad \text{(Eqn. 24)}$$

Figure 10:
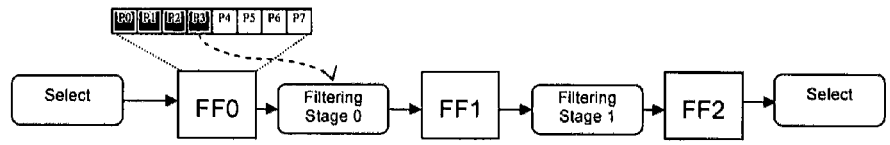
FIG. 10 illustrates an exemplary filtering process of de-blocking in a multimode filter in accordance with one embodiment of the present disclosure.
Figure 10:
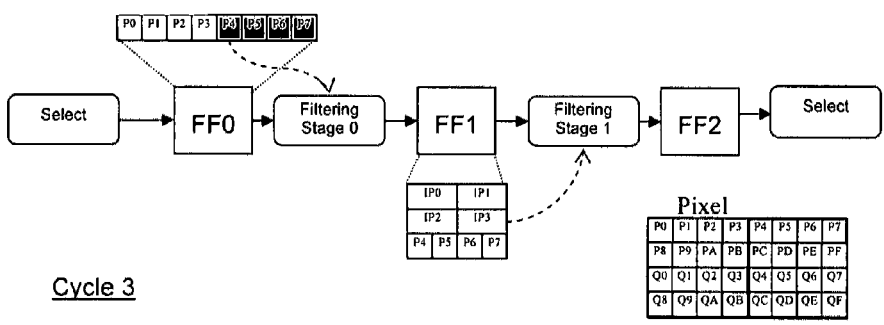
Figure 10:
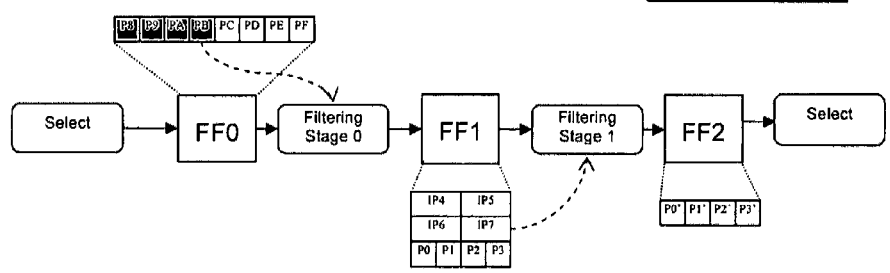
Figure 10:
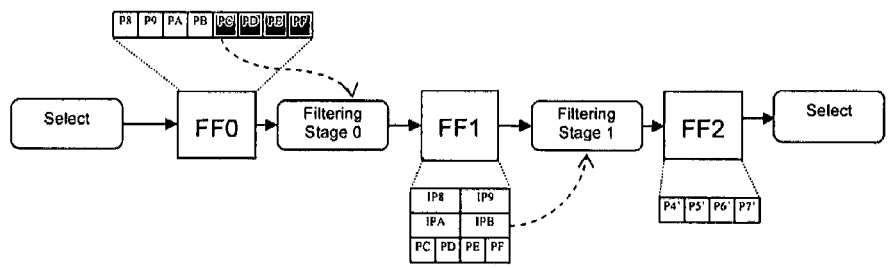

In Equations 17-24, $v_1$ to $v_8$ are input pixels with positions defined in FIG. 3 and $v_1'$ to $v_8'$ are the corresponding filtered pixels. The first filtering stage uses the first half of pixel values while the second filtering stage uses the second half. FIG. 10 illustrates the process of filtering in the multimode filter 104 that exploits the symmetry of the filter. Assuming we have an atomic operation of 4-pixel edges to be filter and 2 4×4 blocks with 32 pixels P0-PF and Q0-QF in the pixel memory. In the first cycle, 8 pixels from the first line P0-P7 are loaded to FF0 and at the same time, P0-P3 are processed in FS0 while P4-P7 are bypassed. The logic process in FS0 is described by a generic filter with 4 similar functions $$f(v_j) = \sum_{i=k}^{k+3} w_{ij} v_i + c_j$$

to generate IP0-IP3 simultaneously. For example for P0', $$IP0 = f(P0) = \sum_{i=1}^{4} w_{i0} v_i + 0$$

and $w_{i0} = \{10, 2, 2, 1\}$ from Equation 17.

In the $2^{nd}$ cycle, P4-P7 are processed in FS0 to generate IP4-IP7 and P0-P3 are bypassed while IP0-IP3 and P4-P7 are loaded to FF1 and are processed in FS1 by equivalent generic filter to generate P0'-P3'. For example for P0', $$P0' = f(P0) = \sum_{i=5}^{7} w_{i0} v_i + IP0.$$

In the $3^{rd}$ cycle, new line P8-PF are loaded to FF0 with P8-PA selected for processing by FS0 and PB-PF bypassed, IP4-IP7 and P0-P3 are loaded to FF1 and are processed in FS1 to generate P4'-P7' while the first output P0'-P4' are loaded to FF2. In the $4^{th}$ cycle, the second half of the line PB-PF are processed in FS0 to generate IPB-IPF while IP8-IPA and PB-PF are processed in FS1 to generate filtered output P8'-PA'. Another cycle is required to complete processing for the 2 4×4 blocks.

Yet another exemplary application of the flexi-standard filter according to an embodiment of the present disclosure is its implementation in MPEG-4 de-ringing. MPEG-4 de-ringing is performed in an 8×8 block in two steps. The first step is to determine the threshold for segmentation. A 32-bit command word is issued to the multimode filter 104 to determine the threshold and range for each 8×8 blocks according to Equations 25 and 26 below. The configuration of the pixel memory 201 is the same as inter-block filtering.

$$thr = \left(\max_{0 \leq i,j \leq 7}\{p_{i,j}\} + \min_{0 \leq i,j \leq 7}\{p_{i,j}\} + 1\right)/2 \quad \text{(Eqn. 25)}$$

$$\text{range} = \left(\max_{0 \leq i,j \leq 7}\{p_{i,j}\} - \min_{0 \leq i,j \leq}\{p_{i,j}\}\right) \quad \text{(Eqn. 26)}$$

In Equations 25 and 26, $p_{i,j}$ is the pixel with position (i,j) in 8×8 block, range is the range of values that the pixels in 833 8 block covers, and thr is the mean value of the range and used as a threshold for segmenting in second process. With the computed values, the modification of the threshold for the luminance block is preferably done by DSP 101.

The second step includes both the index acquisition and the adaptive filtering function as the input data are the same. Another 32-bit command word is issued, providing the max_diff parameter and the threshold value, thr, from the first step. In this case, the pixel memory 201 is configured to intra-block filtering and a 6×6 block is fetched. This configuration is particularly useful as compared to two 4×4 blocks because it exploits the symmetry of the 2D filter window.

In index acquisition operation, filter conditions for the centre 4×4 pixels in pixel memory are determined according to Equations 27-29 below. The filter condition may preferably be stored in two 8-bit words.

$$\text{bin}(x, y) = \begin{cases} 1 & p(x, y) \geq thr \\ 0 & p(x, y) < thr \end{cases} \quad \text{(Eqn. 27)}$$

$$\text{sum}(x, y) = \sum_{j=-1}^{1} \sum_{i=-1}^{1} \text{bin}(i, j) \quad \text{(Eqn. 28)}$$

$$\text{filter\_condition}(x, y) = \begin{cases} 1 & \text{sum}(x, y) = (0 \mid 9) \\ 0 & \text{sum}(x, y) \neq (0 \mid 9) \end{cases} \quad \text{(Eqn. 29)}$$

In Equations 27-29, bin(x,y) is the binary indicator of pixel values above thr or rather it provides a segmentation of the pixel into 2 areas, one above the and one below thr, sum is the sum of binary values in a 3×3 window centered by pixel at position (x,y), and filter_condition is a flag indicator of filtering when the 3×3 window belongs to the same segmented area. Then, in adaptive filtering function, 3×3 windows are selected from pixel memory and filtering is applied on pixels which have filtering condition enabled. The filtering may be split into two filtering stages with the first stage accumulating sum a(x,y) and the second stage computing the final filtered value p(x,y) and clipping the output to p(x,y)±max_diff according to Equations 30-33 below.

$$a(x,y)=(p(x-1,y-1)+2\times p(x,y-1)+p(x+1,y-1)+2\times p(x-1,y)+4\times p(x,y) \quad \text{(Eqn. 30)}$$

$$b(x,y)=2\times p(x+1,y)+p(x-1,y+1)+2\times p(x,y+1)+p(x+1,y+1) \quad \text{(Eqn. 31)}$$

$$p'(x,y)=(a(x,y)+b(x,y))//16 \quad \text{(Eqn. 32)}$$

$$p''(x,y)=\text{clip}(p'(x,y),p(x,y)-\text{max\_diff}, p(x,y)+\text{max\_diff}) \quad \text{(Eqn. 33)}$$

Figure 11:
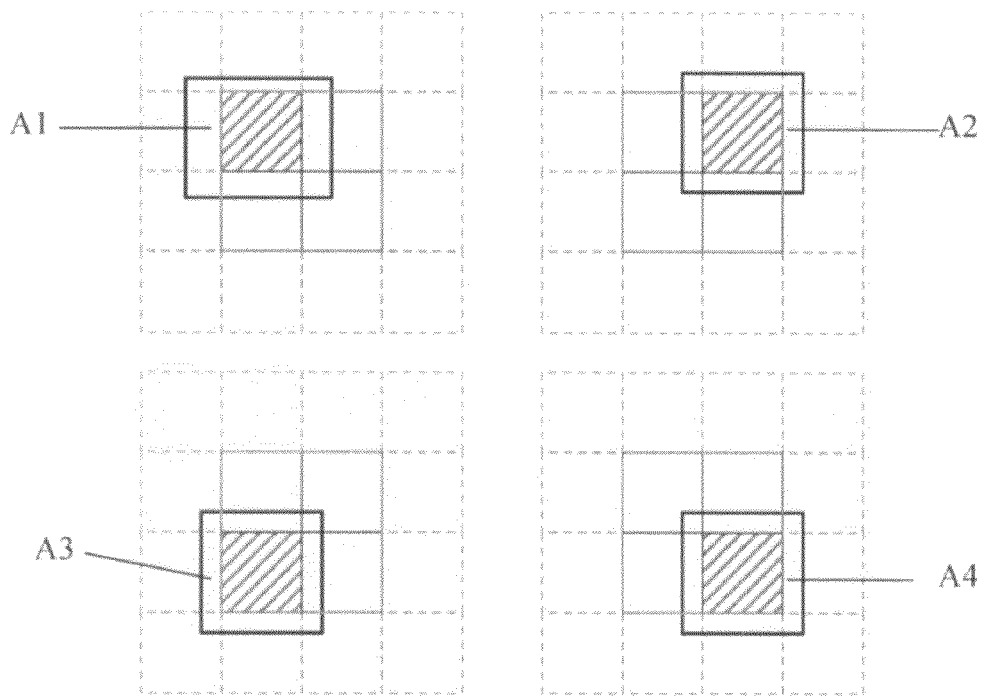
FIG. 11 illustrates an exemplary data flow arrangement of de-ringing in an 8×8 block in accordance with one embodiment of the present disclosure.

In Equations 30-33, p(x,y) is the input pixel value at position (x,y) of the 8×8 block and a(x,y) is the first partial product sum and b(x,y) is the second partial product sum with reference to pixel p(x,y) and p'(x,y) is the filtered pixel value and p"(x,y) is final output value that is clipped and max_diff is maximum allowable pixel change and is defined as half the quantization parameter in MPEG4. FIG. 11 shows an example data flow to the multimode filter for performing de-ringing filtering in 8×8 block. The blocks are processed in sequence of A1, A2, A3, and A4 as shown in FIG. 11.

Figure 12:
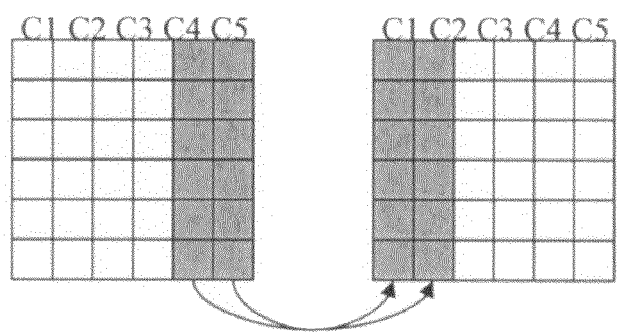
FIG. 12 illustrates the reshuffling of data on pixel memory in pipeline control mode in accordance with one embodiment of the present disclosure.
Figure 13:
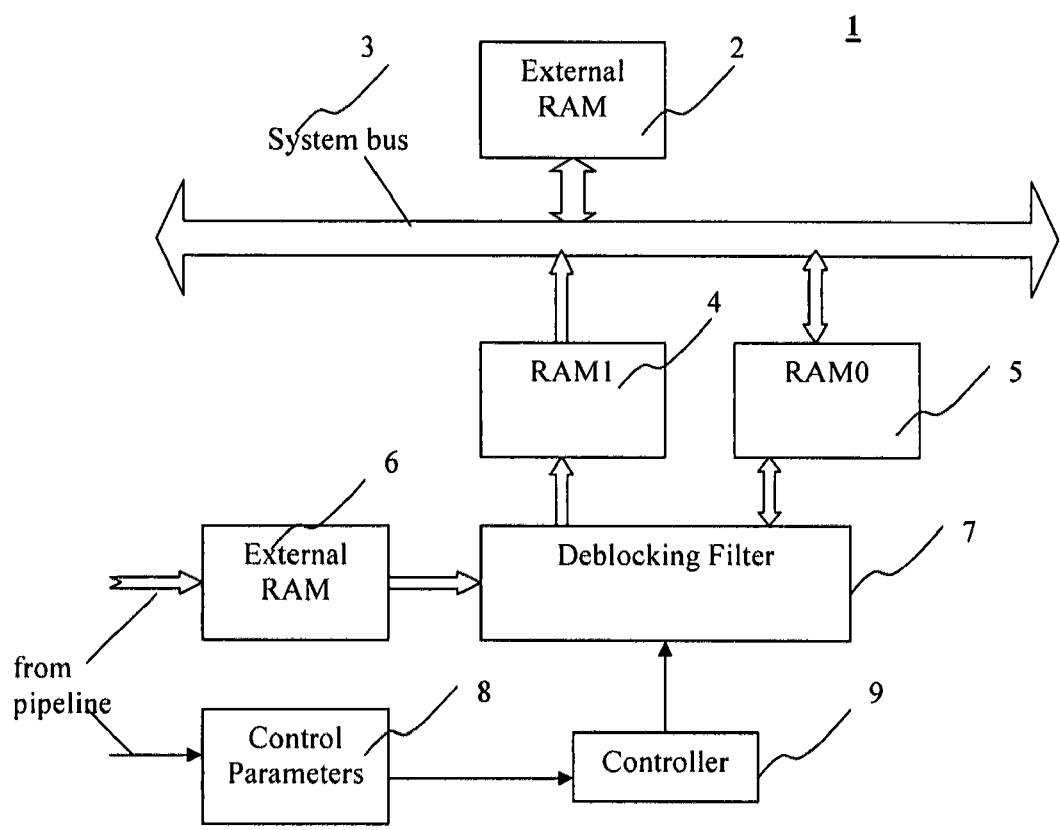
FIG. 13 is a schematic view of the architecture of a known deblocking filter.

Since there is an overlap of pixel values being selected, a pipeline control mode given in FIG. 12. is activated to move the last two columns of pixels (C5, C6) in 6×6 block to the first two columns (C1,C2), resulting in the reduction for re-fetching the same pixel values. For the example pixel memory arrangement in FIG. 5, row data that are overlapped can be similarly re-shuffled between operations in addition to column data. It is obvious to those skilled in the art that the pipeline control mode may be applied to ensure continuity of other filtering processes like edge detection and is not limited to the example description above.

While this detailed description has set forth some embodiments of the present disclosure, the appended claims are sufficiently supported to cover and will cover other embodiments of the present disclosure which differ from the described embodiments according to various modifications and improvements apparent to those skilled in the art. It may be advantageous to set forth definitions of certain words and phrases used in this patent document. The term "couple" and its derivatives refer to any direct or indirect communication between two or more elements, whether or not those elements are in physical contact with one another. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

While this disclosure has described certain embodiments and generally associated methods, alterations and permutations of these embodiments and methods will be apparent to those skilled in the art. Accordingly, the above description of example embodiments does not define or constrain this disclosure. For example, the multimode filter may be employed in encoding processes. In addition, the multimode filter pipeline may comprise different filtering stages. Other changes, substitutions, and alterations are also possible without departing from the spirit and scope of this disclosure, as defined by the following claims.

What is claimed is:

1. A multimode filter for processing digital video signals, the multimode filter comprising:
   a pixel memory configured to store input pixel data to be processed and output pixel data that have been processed, wherein the pixel memory is configured to support both intra-block filtering and inter-block filtering in a same filtering operation;
   a multimode filter pipeline electronically coupled to the pixel memory, the multimode filter pipeline configurable to perform different filtering algorithms with different complexities; and
   a local multimode filter control electronically coupled to the multimode filter pipeline, wherein the local multimode filter control is configured to receive task definitions from a source, decode the task definitions, and generate signals to control operations of the multimode filter pipeline,
   wherein the multimode filter pipeline is configured to receive the control signals from the local multimode filter control, select the input pixel data from the pixel memory, process the selected pixel data according to the task definitions, and output the processed pixel data to the pixel memory,
   wherein the multimode filter pipeline is configured to perform different combinations of concurrent filtering techniques by controlling a scheduling of filtering operations based on the task definitions, the different combinations of filtering techniques associated with different filtering algorithms, and
   wherein the multimode filter pipeline is configured to rearrange the selected input pixel data prior to processing the selected pixel data and to rearrange the processed pixel data prior to output of the processed pixel data, each rearranging based on the task definitions.

2. The multimode filter of claim 1, wherein the combinations of filtering techniques comprise:
   post-processing including de-blocking and de-ringing;
   in-loop processing including de-blocking and de-ringing; and
   overlap smoothing of the selected pixel data.

3. The multimode filter of claim 2, wherein the de-blocking is performed on a multiple-pixel block edge.

4. The multimode filter of claim 2, wherein the de-ringing is performed on a pixel block having multiple pixels along each edge of the pixel block.

5. The multimode filter of claim 1, wherein the pixel memory comprises a 2D register bank that has a fully configurable assembly of registers with addressing logic that is configured to select pixel data in at least one of: one dimension and two dimensions.

6. The multimode filter of claim 5, wherein the pixel memory further comprises an I/O interface configured to receive the input pixel data from a working memory and to send the processed pixel data to the working memory.

7. The multimode filter of claim 1, wherein the task definitions include selection of input/output pixel data and filter logic to be performed.

8. The multimode filter of claim 1, wherein the multimode filter pipeline comprises multiple filtering stages, and
wherein the filtering stages are configurable to allow a serial combination of operations on common pixel data and to split complex operation into different stages for satisfying timing considerations of filter logics.

9. The multimode filter of claim 8, wherein each filtering stage comprises a logic circuit and a flip flop.

10. The multimode filter of claim 8, wherein the multimode filter pipeline further comprises:
starting addressing logic configured to select the input pixel data from the pixel memory, wherein the starting addressing logic is disposed between the pixel memory and a first of the filtering stages; and
ending addressing logic configured to output the processed pixel data back to the pixel memory, wherein the ending addressing logic is disposed between a last of the filtering stages and the pixel memory.

11. The multimode filter of claim 1, wherein the local multimode filter control is configured to operate the multimode filter pipeline in a pipeline control mode whereby the pixel memory has not been cleared after a last write of filtered data back to a memory controller.

12. The multimode filter of claim 11, wherein during the pipeline control mode, some pixel data from one or more prior load cycles for a current task definition are shuffled to a position as the pixel data in one or more load cycles for a next task definition, resulting in data continuity between the current and next task definitions.

13. A flexi-standard filter to process digital video signals, the flexi-standard filter comprising:
a digital signal processor (DSP);
a memory controller;
a line memory; and
a multimode filter configurable to perform different filtering algorithms with different complexities, the multimode filter comprising a pixel memory configured to store input pixel data to be processed and output the pixel data that have been processed, the pixel memory configured to support both intra-block filtering and inter-block filtering in a same filtering operation,
wherein the DSP is configured to control an overall sequence of the flexi-standard filter, make filtering decisions, and program the memory controller with filtering tasks,
wherein the memory controller is configured to receive from the DSP the filtering tasks, fetch data directly from the line memory, and send the data and task definitions to the multimode filter,
wherein the line memory is configured to store locally a working window and one or more lines of luminance and chrominance data that are immediately above a current processed row and that are used in processing of the current row,
wherein the multimode filter is configured to perform the filtering tasks according to the programmed task definitions and to write filtered data back to the memory controller,
wherein the memory controller is configured to re-direct the filtered data to the line memory,
wherein the multimode filter is configured to perform different combinations of concurrent filtering tasks by controlling a scheduling of filtering operations based on the task definitions, the different combinations of filtering tasks associated with the different filtering algorithms, and
wherein the multimode filter is configured to rearrange selected input pixel data prior to processing the selected pixel data and to rearrange the processed pixel data prior to output of the processed pixel data, each rearranging based on the task definitions.

14. The flexi-standard filter of claim 13, wherein the DSP comprises:
a programmable core configured to execute logic and arithmetic instructions and perform data transfer operations;
an instruction memory cache configured to store instructions to be given to the memory controller; and
a data memory cache configured to store input data to be transferred to the memory controller.

15. The flexi-standard filter of claim 13, wherein the DSP comprises at least one of: a generic processor and a power processor.

16. The flexi-standard filter of claim 13, wherein the line memory comprises a memory chip that is totally separated from the DSP.

17. The flexi-standard filter of claim 13, wherein the line memory comprises an embedded memory within the DSP and is configured to be controlled by the memory controller.

18. The flexi-standard filter of claim 13, wherein the multimode filter is configured to operate in parallel with the DSP and is under sole control of the memory controller.

19. The flexi-standard filter of claim 13, wherein the multimode filter further comprises:
a multimode filter pipeline electronically coupled to the pixel memory; and
a local multimode filter control electronically coupled to the multimode filter pipeline, wherein the local multimode filter control is configured to receive the task definitions, decode the task definitions, and generate signals to control operations of the multimode filter pipeline;
wherein the multimode filter pipeline is configured to receive the control signals from the local multimode filter control, select the input pixel data from the pixel memory, process the selected pixel data according to the task definitions, and output the processed pixel data to the pixel memory.

20. The flexi-standard filter of claim 19, wherein the combinations of filtering techniques comprise:
post-processing and in-loop processing, wherein the post-processing and in-loop processing each includes de-blocking and de-ringing; and
overlap smoothing of the selected pixel data.

21. The flexi-standard filter of claim 20, wherein the de-blocking is performed on a multiple-pixel block edge.

22. The flexi-standard filter of claim 20, wherein the de-ringing is performed on a pixel block having multiple pixels along each edge of the pixel block.

23. The flexi-standard filter of claim 19, wherein the pixel memory comprises a 2D register bank that has a fully configurable assembly of registers with addressing logic that is configured to select pixel data in at least one of: one dimension and two dimensions.

24. The flexi-standard filter of claim 23, wherein the pixel memory further comprises an I/O interface configured to receive the input pixel data from a working memory and send the processed pixel data to the working memory.

25. The flexi-standard filter of claim 19, wherein the task definitions include selection of input/output pixel data and filter logic to be performed.

26. The flexi-standard filter of claim 19, wherein the multimode filter pipeline comprises multiple filtering stages, and
wherein the filtering stages are configurable to allow a serial combination of operations on common pixel data and to split complex operation into different stages for satisfying timing considerations of filter logics.

27. The flexi-standard filter of claim 26, wherein each filtering stage comprises a logic circuit and a flip flop.

28. The flexi-standard filter of claim 26, wherein the multimode filter pipeline further comprises:
starting addressing logic configured to select the input pixel data from the pixel memory, wherein the starting addressing logic is disposed between the pixel memory and a first of the filtering stages; and
ending addressing logic configured to output the processed pixel data back to the pixel memory, wherein the ending addressing logic is disposed between a last of the filtering stages and the pixel memory.

29. The flexi-standard filter of claim 19, wherein the local multimode filter control is configured to operate the multimode filter pipeline in a pipeline control mode whereby the pixel memory has not been cleared after a last write of the filtered data back to the memory controller.

30. The flexi-standard filter of claim 29, wherein during the pipeline control mode, some pixel data from one or more prior load cycles for a current task definition are shuffled to a position as the pixel data in one or more load cycles for a next task definition, resulting in data continuity between the current and next task definitions.

31. An electronic device with a decoder for processing digital video signals, the electronic device comprising:
entropy decoder circuitry configured to decode an input of encoded video bitstreams to extract video header parameters and video coefficients;
inverse transform circuitry configured to convert the video coefficients to pixels values;
inverse quantizer circuitry configured to inverse quantize the coefficients;
motion compensation circuitry configured to compensate motion inter-pixel data by reference motion vectors; and
a flexi-standard filter, wherein the flexi-standard filter comprises:
a digital signal processor (DSP);
a memory controller;
a line memory; and
a multimode filter configurable to perform different filtering algorithms with different complexities, the multimode filter comprising a pixel memory configured to store input pixel data to be processed and output the pixel data that have been processed, the pixel memory configured to support both intra-block filtering and inter-block filtering in a same filtering operation,
wherein the DSP is configured to control an overall sequence of the flexi-standard filter, make filtering decisions, and program the memory controller with filtering tasks,
wherein the memory controller is configured to receive from the DSP the filtering tasks, fetch data directly from the line memory, and send the data and task definitions to the multimode filter,
wherein the line memory is configured to store locally a working window and one or more lines of luminance and chrominance data that are immediately above a current processed row and that are used in processing of the current row,
wherein the multimode filter is configured to perform the filtering tasks according to the programmed task definitions and write filtered data back to the memory controller,
wherein the memory controller is configured to re-direct the filtered data to the line memory,
wherein the multimode filter is configured to perform different combinations of concurrent filtering tasks by controlling a scheduling of filtering operations based on the task definitions, the different combinations of filtering tasks associated with the different filtering algorithms, and
wherein the multimode filter is configured to rearrange selected input pixel data prior to processing the selected pixel data and to rearrange the processed pixel data prior to output of the processed pixel data, each rearranging based on the task definitions.

32. The electronic device of claim 31, wherein the electronic device comprises at least one of: a set-top-box, a digital TV, a DVD player, a DVD recorder, a PC, a notebook, a PDA, and a mobile phone.

33. A method of digital signal processing, the method comprising:
receiving digital signal data and storing the received digital signal data in a local memory;
receiving processing parameters and code instructions and storing the received processing parameters and code instructions in a digital signal processor;
forming task definitions using the received processing parameters and code instructions within the digital signal processor and outputting the task definitions to a memory control;
transmitting the digital signal data by the memory control according to the task definitions to a multimode filter;
processing the digital signal data by the multimode filter according to the task definitions;
storing the processed digital signal data in a pixel memory in the multimode filter, the pixel memory configured to support both intra-block filtering and inter-block filtering in a same filtering operation; and
outputting the processed digital signal data to at least one of: the local memory and an external memory,
wherein processing the digital signal data by the multimode filter comprises performing different filtering algorithms with different complexities, the multimode filter configured to perform different combinations of concurrent filtering techniques by controlling a scheduling of filtering operations based on the task definitions, the different combinations of filtering techniques associated with the different filtering algorithms, and
wherein the method further includes rearranging the digital signal data prior to processing the digital signal data and rearranging the processed digital signal data prior to output of the processed digital signal data, each rearranging based on the task definitions.

34. The process of claim 33, wherein receiving the digital signal data comprises receiving the digital signal data after the digital signal data have gone through motion compensation.

35. The process of claim 33, wherein receiving the processing parameters and code instructions comprises receiving the processing parameters from a FIFO control interface and receiving the code instructions from a control bus.

36. The process of claim 33, wherein storing the received processing parameters and code instructions in the digital signal processor comprises storing the received processing parameters and code instructions into different memory locations within the digital signal processor.

37. The process of claim 33, wherein the combinations of filtering techniques comprise:

in-loop processing including de-blocking and de-ringing;
post-processing including de-blocking and de-ringing; and
overlap smoothing of the digital signal data.

38. The process of claim 37, wherein processing the digital signal data by the multimode filter according to the task definitions further comprises:

using a fully configurable assembly of registers in a 2D register bank to store the digital signal data.

39. The process of claim 33, wherein outputting the processed digital signal data comprises storing information to be used for a next process into a memory of the multimode filter so that read/write cycle time is saved.

* * * * *

UNITED STATES PATENT AND TRADEMARK OFFICE
CERTIFICATE OF CORRECTION

PATENT NO. : 8,369,420 B2  
APPLICATION NO. : 11/895023  
DATED : February 5, 2013  
INVENTOR(S) : Patricia Chiang et al.

Page 1 of 1

It is certified that error appears in the above-identified patent and that said Letters Patent is hereby corrected as shown below:

Title Page, item (73) should read:

-- STMicroelectronics Asia Pacific Pte, Ltd., Singapore (SG); STMicroelectronics SA, France (FR); and STMicroelectronics (Research & Development) Ltd., United Kingdom (UK) --

Signed and Sealed this
Eighteenth Day of March, 2014

Michelle K. Lee  
*Deputy Director of the United States Patent and Trademark Office*